(12) United States Patent  
Stephan et al.

(10) Patent No.: US 8,136,341 B2  
(45) Date of Patent: Mar. 20, 2012

(54) TRACK BEAM FOR THE COWLING OF JET ENGINES

(75) Inventors: Walter Stephan, St. Martin (AT); Roland Zeillinger, Klosterneuburg (AT); Andreas Maier, Innermanzing (AT)

(73) Assignee: FACC AG, Ried Im Innkreis (AT)

( * ) Notice: Subject to any disclaimer, the term of this patent is extended or adjusted under 35 U.S.C. 154(b) by 1079 days.

(21) Appl. No.: 11/732,026

(22) Filed: Apr. 2, 2007

(65) Prior Publication Data

US 2007/0294996 A1    Dec. 27, 2007

(30) Foreign Application Priority Data

Jun. 23, 2006 (AT) ................... A 1065/2006

(51) Int. Cl.  
*F02K 3/02* (2006.01)

(52) U.S. Cl. ...... 60/226.2; 60/232; 60/230; 239/265.29; 239/265.31; 244/110 B

(58) Field of Classification Search ................. 60/226.2, 60/232, 230; 239/265.29, 265.31; 244/110 B  
See application file for complete search history.

(56) References Cited

U.S. PATENT DOCUMENTS

| | | | |
|---|---|---|---|
| 5,083,426 A | | 1/1992 | Layland |
| 5,251,435 A | * | 10/1993 | Pauley ........................ 60/226.1 |
| 6,170,256 B1 | * | 1/2001 | Berdoyes et al. ............... 60/232 |
| 6,210,773 B1 | | 4/2001 | Moore |
| 6,584,763 B2 | * | 7/2003 | Lymons et al. ............. 60/226.2 |
| 6,824,101 B2 | * | 11/2004 | Sternberger et al. ...... 244/110 B |

FOREIGN PATENT DOCUMENTS

| | | |
|---|---|---|
| EP | 0 540 193 A1 | 5/1993 |
| EP | 0 586 000 A1 | 3/1994 |

\* cited by examiner

*Primary Examiner* — Ehud Gartenberg  
*Assistant Examiner* — Craig Kim  
(74) *Attorney, Agent, or Firm* — Laurence A. Greenberg; Werner H. Stemer; Ralph E. Locher

(57) ABSTRACT

Track beams for the cowling of a jet engine for aircraft are formed of a base body with at least one slide for displaceably mounting a thrust reverser of the jet engine. A connection is provided for an inner engine cowling and fittings for detachably and pivotally attaching to a supporting structure or for connecting to another track beam. To provide such a track beam which has a particularly low weight yet, nevertheless, is sufficiently stiff, the base body is formed by a hollow profile section with a substantially closed cross-section. The hollow section is produced of a carbon-fiber-reinforced synthetic material by way of a resin-infusion process. Two flanges are provided on the hollow section of the base body of the track beam for providing a connection to the inner engine cowling.

22 Claims, 5 Drawing Sheets

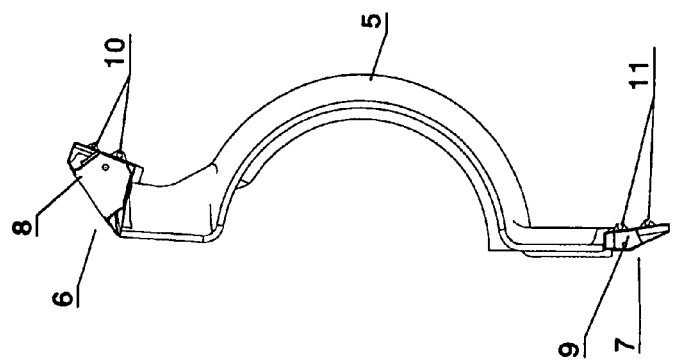
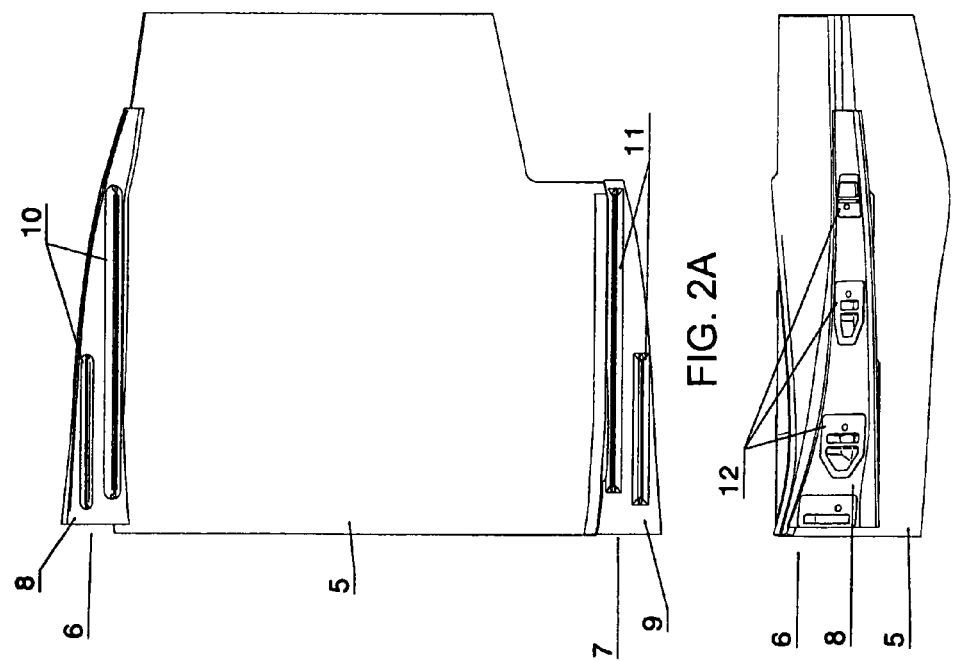

TRACK BEAM FOR THE COWLING OF JET ENGINES

CROSS-REFERENCE TO RELATED APPLICATION

This application claims the priority, under 35 U.S.C. §119, of Austrian application A 1065/2006, filed Jun. 23, 2006; the prior application is herewith incorporated by reference in its entirety.

BACKGROUND OF THE INVENTION

Field of the Invention

The invention relates to a track beam for the cowling of an aircraft jet engines. The device has a base body with at least one sliding means for displaceably mounting a thrust reverser, with a connection means for an inner engine cowling and with fittings for a detachable and pivotable attachment to a supporting structure or for connection to another track beam.

Modern jet engines as are mainly used for the propulsion of aircraft have a so-called thrust reversing mechanism. The thrust reversion is required for braking the aircraft on the ground by generating a thrust against the direction of movement. In jet engines, usually the engine jet is deflected to the front by suitable flaps (the so-called blocker doors), whereby the engine jet causes slowing down of the aircraft. By this, the distance required by the aircraft for landing is shortened. Usually, the thrust reversing mechanism contains a displaceably mounted part of the outer engine cowling, the so-called "translating sleeve," on which the blocker doors which finally serve for deflecting the air flow are movably arranged. The air which has been deflected via the blocker doors is deflected through a gap in the engine cowling which results between the rearwardly displaced part of the external engine cowling and the remaining engine cowling. During normal operation of the engine, the air flow is pressed through a gap formed between an outer and inner engine cowling, whereby the thrust is generated.

The primarily important parts of the engine cowling comprise an inner engine cowling which is arranged around the jet engine, and an outer engine cowling as well as the longitudinally displaceably arranged part of the outer engine cowling which forms the thrust reversing mechanism. That part of the outer engine cowling which is displaceable in the longitudinal direction of the engine slides on a total of four track beams which are connected to the inner engine cowling. The inner cowling of the engine consists of two substantially semi-cylindrical wall parts which enclose the engine. The cowling of the engine must be designed so stable that in case of an explosion of the engine, parts will not be hurled outwards, where they could damage further parts of the aircraft. The wall parts of the inner engine cowling are connected both on the upper side (in the 12 o'clock position) and on the lower side (in the 6 o'clock position) with one track beam each. The track beams usually consist of metal, such as aluminum or titanium alloys, e.g., and are connected to the inner engine cowling by rivets and/or screws. The upper track beams at the 12 o'clock position of the engine cowling, the so-called "hinge beams", are pivotably connected to a supporting structure, the so-called pylon, via corresponding hinge joints. The hinge joints are connected to the upper track beams via appropriate fittings. The lower track beams at the 6 o'clock-position of the engine cowling, the so-called "latch beams" are fixedly interconnected via appropriate connecting elements. For fastening these connecting elements, corresponding fittings are also provided at the lower track beams.

Earlier constructions of the track beams are relatively expensive to produce and, moreover, are comparatively heavy. To reduce the weight, the wall parts of the inner engine cowling often are made of synthetic composite material. In the region of the engines, enormously high temperatures occur, to which particularly the parts of the inner engine cowling are exposed. Since synthetic composite materials and metals have highly different temperature coefficients, different expansions of the wall portions made of synthetic composite materials and the track beams made of metal will occur in case of temperature fluctuations. Therefore, especially at the connecting site between the parts made of synthetic composite material and the metal parts, particularly high shearing forces will occur. As a consequence, the connections between the synthetic material part and the metal part must be overdimensioned, and an appropriately large number of screws or rivets has to be provided. Apart from the greater effort and the higher costs, the larger number of connecting elements also results in a greater weight of the engine cowling.

European patent EP 586 000 B1, by way of example, shows a thrust reverser which is made of a non-metallic, carbon-fiber-reinforced composite material of honey-comb structure with a higher heat conductivity. In this way, a lower weight of the thrust reverser is achieved with a simultaneously good heat dissipation. This document, however, does not contain any information regarding the structures to which the thrust reverser is secured.

European published patent application EP 540 193 A1 describes an inner engine cowling of the instant type, which is made of a composite material comprising carbon fibers, wherein the wall parts of the engine cowling are integrally produced with the flanges. Fastening of the cowling to supporting elements is not described.

U.S. Pat. No. 5,083,426 describes an inner engine cowling in which the wall parts surrounding the engine are also integrally formed of a synthetic composite material.

U.S. Pat. No. 6,584,763 B2 describes an engine cowling with a thrust reversing mechanism, wherein there is no information regarding the nature of the track beams and their connection to the inner engine cowling.

There have already been attempts to produce also the track beams of the engine cowling of fiber-reinforced synthetic material so as to reduce the weight. However, because of the high stiffness required for these components, it has been necessary to produce particularly complex constructions with a plurality of stiffening structures involving particularly high production expenditures, yet also a comparatively heavy weight.

SUMMARY OF THE INVENTION

It is accordingly an object of the invention to provide a guide carrier for the cowling of a jet engine which overcomes the above-mentioned disadvantages of the heretofore-known devices and methods of this general type and which provides for a track beam for an engine cowling which has as low a weight as possible and reduces the above-described disadvantages with regard to thermal expansion. Despite a low weight, the track beam shall be as stiff as possible and withstand high loads. Moreover, the track beam shall be as simple to produce and have as good long-term properties as possible.

With the foregoing and other objects in view there is provided, in accordance with the invention, a track beam for the cowling of an aircraft jet engine. The novel device comprises:

a base body having at least one sliding device for displaceably mounting a thrust reverser of the jet engine;

the base body being formed as a hollow section with a substantially closed cross-section, the hollow profile being formed of a carbon-fiber-reinforced synthetic material by way of a resin-infusion process;

a connection for an inner engine cowling; and fittings for a detachable and pivotable attachment to a supporting structure or for connection to another track beam.

In other words, the objects of the invention are achieved in that the base body of the track beam is formed by a hollow section having a substantially closed cross-section, which hollow section is produced of carbon-fiber-reinforced synthetic material according to the resin-infusion method. By constructing the base body of the track beam in the form of a hollow section having a substantially closed cross-section, the required stiffness is achieved with simultaneous thin wall thicknesses and, thus, a low weight. Thus, in contrast to track beams of the prior art which are made of metal and contain a number of stiffening ribs, no complex molds need to be used for the production, resulting in a simple producibility and low production costs. Due to the fact that also the track beam, which usually is made of metal, is made of carbon-fiber-reinforced synthetic material, the weight of the engine cowling can, thus, be reduced, and also the problem of different thermal expansions and, thus, of shearing forces occurring between track beam and inner engine cowling can be largely reduced. By a resin-infusion production method, the formation of complicated three-dimensional components with special properties is possible. The resin-infusion method has advantages over conventional production methods using an autoclave in which the prepreg material is cured. Moreover, the parts can be produced at lower costs, compared to forged and milled parts made of aluminum and titanium alloys. Advantageously, the track beam is made substantially of the same material as the inner engine cowling. Thereby, both the track beam and also the inner engine cowling have the same thermal expansion, and no, or no substantial, shearing forces will occur at the connection between the track beam and the inner engine cowling. As a consequence, the connecting elements can be reduced and, thus, weight can be saved.

Advantageously, the hollow section is made of carbon-fiber-reinforced synthetic material according to the resin transfer molding (RTM) method.

Parts of the hollow section can be prefabricated of carbon fabric and can be installed during the production of the entire hollow section of carbon-fiber-reinforced synthetic material according to the resin infusion method, in particular the RTM method. In this way, complex parts of the track beam can be prefabricated in simpler molds and then can be used during the production according to the resin infusion method.

The fittings of the track beams may be integrated in the hollow section of the base body and produced in one piece therewith. This does increase the mold expenditures when producing the hollow section of the base body, yet connections between the fittings and the hollow section of the base body will be avoided.

As an alternative thereto, the fittings can also be produced of carbon-fiber-reinforced synthetic material according to the resin infusion method, in particular the RTM method, and subsequently be connected to the finished hollow section, in particular glued thereto. By these measures, the mold expenditures during the resin infusion production is reduced. Yet, gluing together of the parts becomes necessary.

Finally, the fittings may also be made of metal in a conventional manner and connected to the hollow sections, in particular glued thereto.

For an optimum connection of the track beams with the inner engine cowling, the hollow section has at least two flanges for forming the connection for the inner engine cowling, wherein the end of the inner engine cowling can be inserted between the flanges. By means of the flanges, an optimum introduction of the forces into the inner engine cowling is achieved, whereby fewer connecting elements will be required for connecting the inner engine cowling to the hollow section.

According to a further feature of the invention, the inner engine cowling is connected to the hollow section by gluing. By such gluing, the connecting elements made of metal are omitted, or their number can be reduced, respectively, resulting, in turn, in a reduction of the total weight of the engine cowling.

As an alternative or in addition, the flanges may also have at least one bore for receiving a connecting element, e.g. a bolt, a screw or the like. In this instance, it is sought to use as few connecting elements as possible, so that a change of the inner engine cowling can be carried out more rapidly. The use of connecting elements as opposed to a connection by gluing has, of course, also the advantage that maintenance, or a replacement, respectively, of the inner engine cowling which ages more rapidly as a consequence of the thermal load will easily be possible, or be possible at all, respectively.

In case of a connection by gluing, additional cover layers of fiber-reinforced synthetic material may be glued to the inner engine cowling and to the hollow section.

Advantageously, the hollow section and, optionally, the fittings contain carbon fabric for reinforcement purposes. The carbon fibers have advantages in terms of weight and strength properties.

If reactive materials, such as, e.g., nylon, are sewed or woven into the carbon fabric, certain properties, such as strength or impact resistance, can be increased. The carbon fabric may, for instance, be interwoven with nylon and, after the addition of the resin, the nylon material may be dissolved, thereby increasing the impact resistance.

According to a further characteristic feature, the hollow section may comprise stiffening structures, in particular stiffening ribs. These stiffening structures provide the track beam with a higher stiffness with a simultaneous low weight. The stiffening structures will, of course, increase the mold expenditures during the production according to the resin infusion method.

Preferably, the hollow section has grooves for forming the sliding means for displaceably mounting the thrust reverser. These grooves may be made during the production of the hollow section according to the resin infusion method, or they may also be made of carbon fabric in a separate working step and subsequently be integrated in the production process of the hollow section.

According to a further feature of the invention, the grooves have a sector-shaped cross-section. In these sector-shaped grooves, the sliding elements which are attached to the thrust reverser, or to that part of the outer engine cowling that is displaceable in the longitudinal direction of the engine, respectively, will slide in an optimum manner.

Other features which are considered as characteristic for the invention are set forth in the appended claims.

Although the invention is illustrated and described herein as embodied in track beam for the cowling of jet engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2A to 2C show the part of the engine cowling according to FIGS. 1A to 1C, without that part of the outer engine cowling which forms the thrust reversing mechanism;

DESCRIPTION OF THE PREFERRED EMBODIMENTS

Figure 1C:
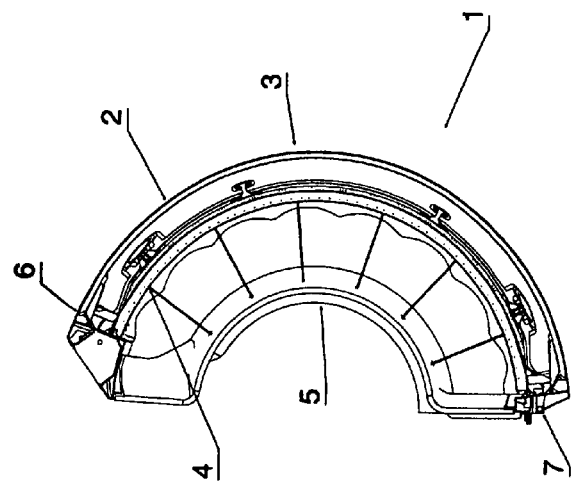
FIG. 1C shows the engine cowling according to FIG. 1a, seen from the front.
Figure 1A:
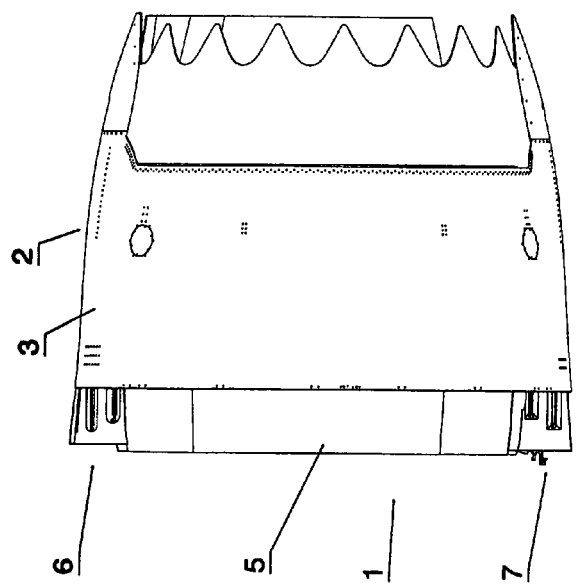
FIG. 1A shows the side view on the rear part of a cowling of a jet engine.
Figure 1B:
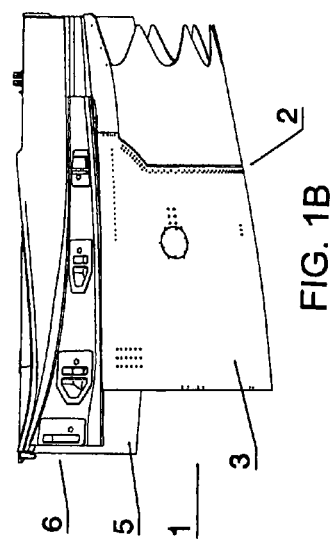
FIG. 1B shows the engine cowling according to FIG. 1a in a top view.

Referring now to the figures of the drawing in detail and first, particularly, to the different views in FIGS. 1A to 1C thereof, there is shown the rear part of the cowling 1 of a jet engine for aircraft. As can be seen from FIG. 1C, only one half of the cowling 1 has been illustrated for a better overview. The entire rear cowling 1 of the jet engine consists of two such parts of the cowling 1, which are arranged in mirror-inverted relationship to each other. The thrust reverser 2 substantially consists of an outer engine cowling 3, the so-called "translating sleeve" which is mounted to be displaceable in the longitudinal direction of the engine. On the displaceable part of the outer engine cowling 3, there are the blocker doors 4 which block the air flow through the gap between the outer engine cowling 3 and the inner engine cowling 5 when the thrust reverser 2 is activated. The displaceable part of the outer engine cowling 3 slides on corresponding track beams 6, 7 which are connected to the inner engine cowling 5. Track beams 6 are arranged at the 12 o'clock position of the engine cowling 1, and track beams 7 are arranged on the 6 o'clock position of the engine cowling 1.

As can be better seen from FIGS. 2A to 2C, in which the outer engine cowling 3 of the thrust reverser 2 has been removed as compared to FIGS. 1A to 1C, the track beams 6, 7 each consist of a base body 8, 9 and at least one sliding means 10, 11 each, on which the thrust reverser 2 is displaceably mounted. The sliding means 10, 11 are comprised of a groove, e.g. with sector-shaped cross-section, in which a corresponding complementary shaped element that is fastened to the thrust reverser can be mounted so as to be displaceable in the longitudinal direction of the engine cowling 1 (not illustrated). Moreover, the track beams 6, 7 comprise corresponding fittings 12, 13 for fastening to a supporting structure or for connection to another track beam 7. For the purpose of maintenance carried out on the engine, the upper track beams 6 are detachably and pivotably fastened to the supporting structure, the so-called pylon, via corresponding hinge-joints (not illustrated) which are connected to the fittings 12. The lower track beams 7, however, are fixed by connecting the fittings 13 (cf. FIGS. 5 and 6) to corresponding connecting elements, so that an unintentional opening of the engine cowling 1 cannot occur.

The track beams 6, 7 of the invention are illustrated in detail in FIGS. 3 to 6.

Figure 3:
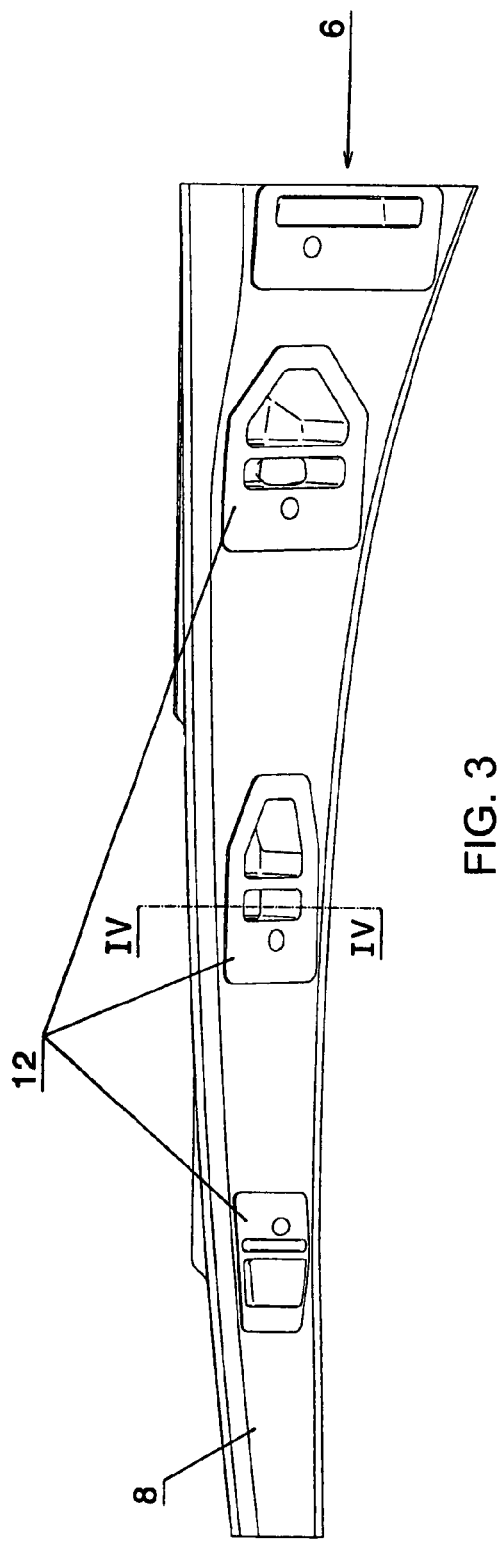
FIG. 3 shows a design according to the invention of an upper track beam.
Figure 4:
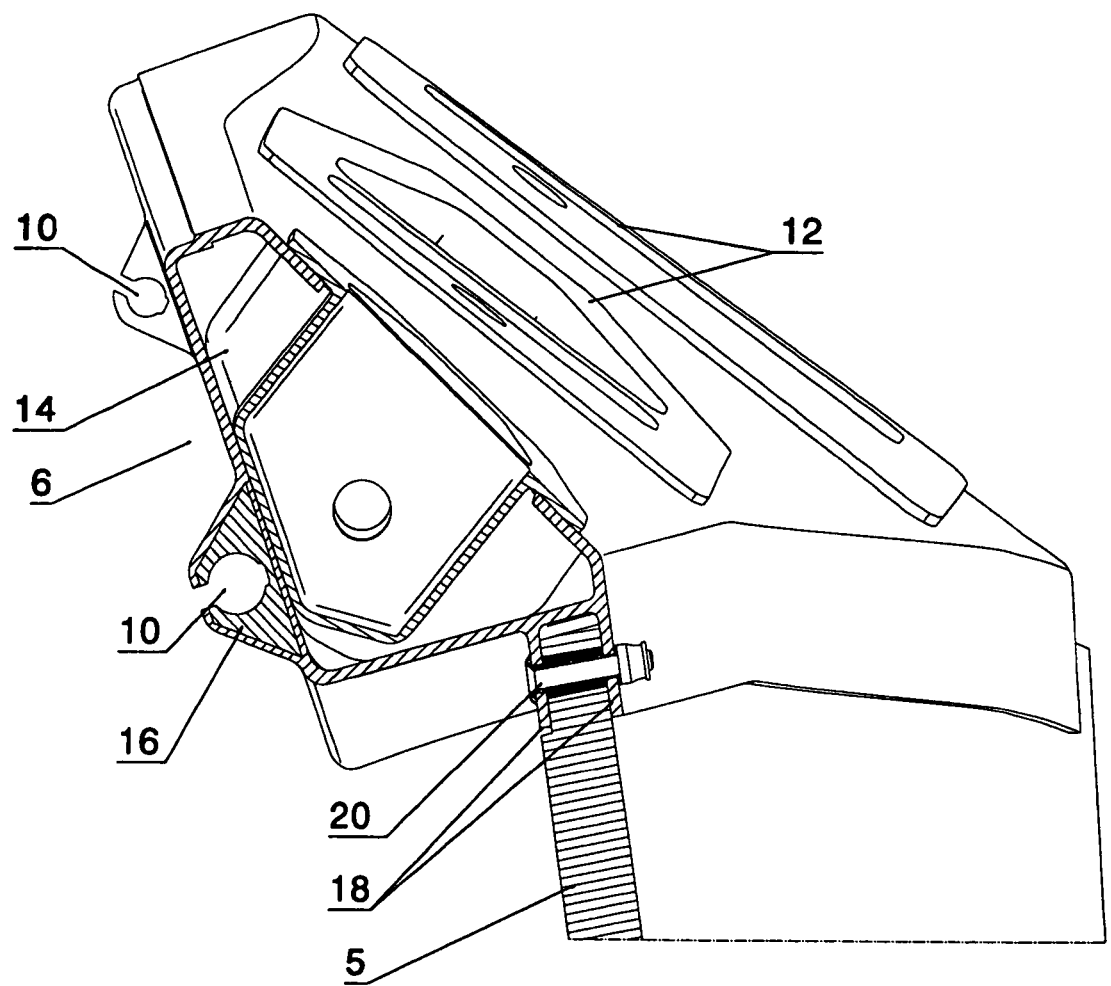
FIG. 4 illustrates a section, taken along section line IV-IV, through the upper track beam according to FIG. 3.

In FIG. 3 and in the sectional illustration according to FIG. 4, an upper track beam 6 is shown whose base body 8 according to the invention is formed of a hollow section 14, or a hollow profile 14, with a substantially closed cross-section.

Figure 5:
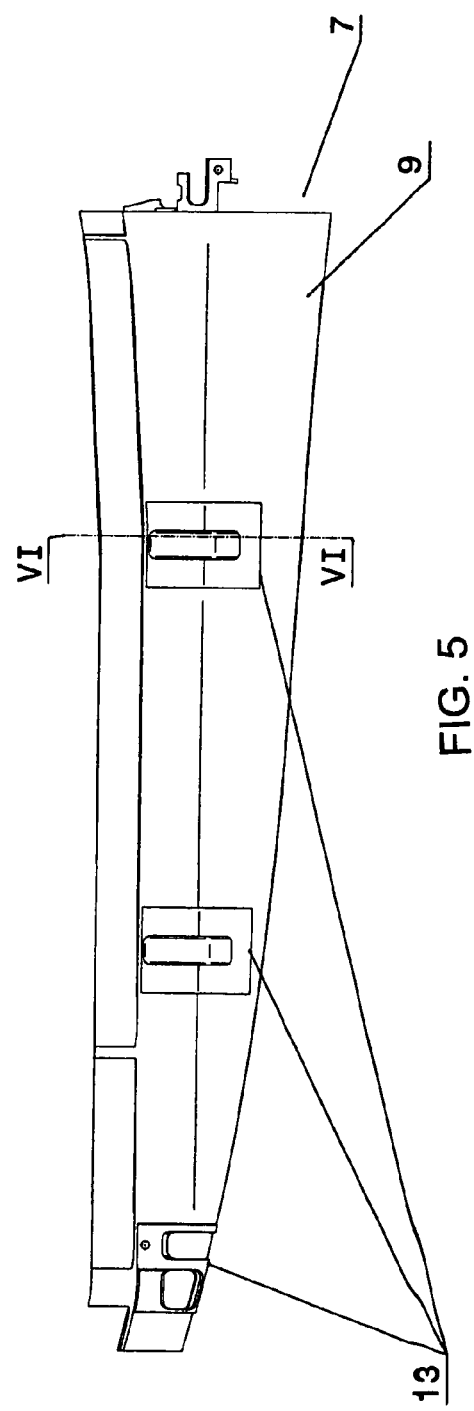
FIG. 5 shows an implementation according to the invention of a lower track beam.
Figure 6:
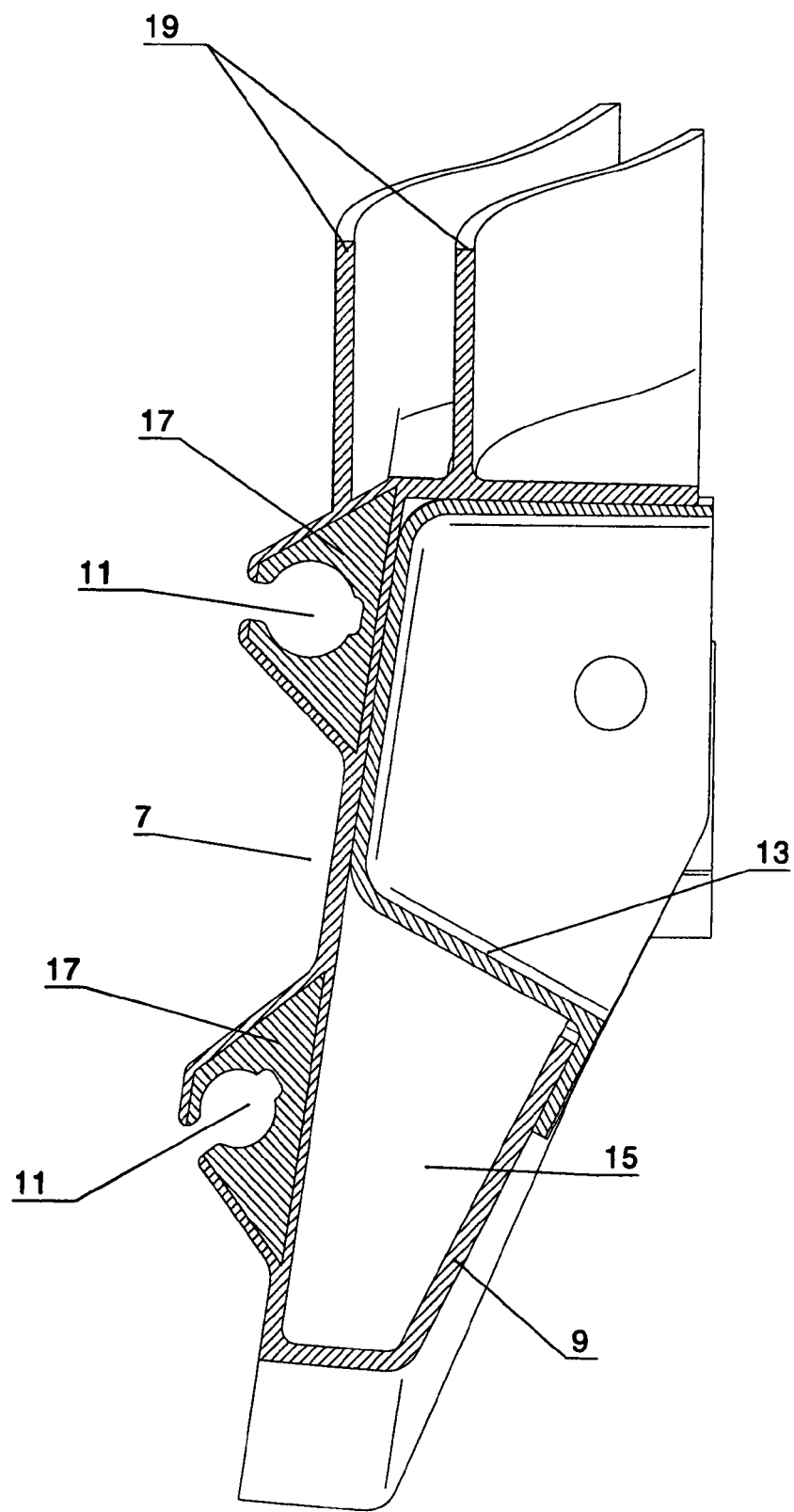
FIG. 6 illustrates a section, taken along section line VI-VI, through the lower track beam according to FIG. 5.

Likewise, according to FIGS. 5 and 6, the base body 9 of the lower track beam 7 is formed by a hollow section 15, or hollow profile 15, having a substantially closed cross-section.

According to the invention, the hollow profile 14, 15 of the base body 8, 9 of the track beams 6, 7 is made of carbon-fiber-reinforced synthetic material according to the resin infusion method, in particular the RTM method. On account of the inventive designing of the track beams 6, 7 by a hollow section 14, 15, the countless stiffening ribs present in common track beams of metal can be omitted, and therefore the mold expenditures for the production according to the resin infusion method are relatively little. The hollow section 14, 15 provides the track beams 6, 7 with the required stiffness. Parts of the hollow section 14, 15 may be prefabricated from carbon fabric and incorporated in the production method of the hollow section 14, 15. For instance, the parts 16, 17 which form the sliding means 10, 11 may be prefabricated from carbon fabric and placed into the mold when producing the hollow sections 14, 15 according to the resin infusion method. The fittings 12, 13 may be integrated in the hollow section 14, 15 and produced in one piece therewith. Likewise, the fittings 12, 13 may be produced of carbon-fiber-reinforced synthetic material according to the resin infusion method and subsequently be connected to the hollow section 14, 15, in particular by gluing thereto. Likewise, it is possible for the fittings 12, 13 to be made of metal and to be connected to the hollow section 14, 15, in particular by gluing, or also by screwing or riveting.

For an optimum connection of the track beams 6, 7 with the inner engine cowling 5, the hollow section 14, or 15, respectively, each has two flanges 18, or 19, respectively, to form the connection means for the inner engine cowling 5. In FIG. 4, the connection means of the inner engine cowling 5 to the hollow section 14 of the upper track beam 6 is illustrated. By this connection via the flanges 18, 19, an optimum introduction of the forces from the track beam 6, 7 into the inner engine cowling 5 is achieved, and therefore fastening can be effected with few fastening elements only. In this instance, the inner engine cowling 5 may be connected with the hollow section 14, 15 by gluing or by corresponding connecting elements 20 which are plugged through corresponding bores in the flanges 18, 19. Here, it is advantageous to use as few connecting elements 20 as possible so that an exchange of the inner engine cowling 5 can be carried out as rapidly as possible.

By the inventive track beam 6, 7, the engine cowlings 1 can be produced with low weight, yet nevertheless sufficient stiffness.

We claim:

1. A track beam for the cowling of an aircraft jet engine, comprising:

a base body having at least one sliding device for displaceably mounting a thrust reverser of the jet engine;

said base body being formed as a hollow section with a closed cross-section, said hollow section being formed of a carbon-fiber-reinforced synthetic material by way of a resin-infusion process;

a connection for an inner engine cowling; and fittings disposed in openings formed in said base body for a detachable and pivotable attachment to a supporting structure or for connection to another track beam.

2. The track beam according to claim 1, wherein said hollow section is made of a carbon-fiber-reinforced synthetic material in a resin transfer molding process.

3. The track beam according to claim 1, wherein said hollow section contains prefabricated carbon fabric parts.

4. A track beam for the cowling of an aircraft jet engine, comprising:

a base body having at least one sliding device for displaceably mounting a thrust reverser of the jet engine;

said base body being formed as a hollow section with a closed cross-section, said hollow section being formed of a carbon-fiber-reinforced synthetic material by way of a resin-infusion process;

a connection for an inner engine cowling; and fittings for a detachable and pivotable attachment to a supporting structure or for connection to another track beam, said fittings being disposed in openings formed in said base body, said fittings being integrally formed with said hollow section of said base body in a unitary, single part.

5. The track beam according to claim 1, wherein said fittings are formed of carbon-fiber-reinforced synthetic material in a resin infusion process and subsequently connected to said hollow section.

6. The track beam according to claim 5, wherein said fittings are glued to said hollow section.

7. The track beam according to claim 1, wherein said fittings are metal fittings connected to said hollow section.

8. The track beam according to claim 7, wherein said metal fittings are glued to said hollow section.

9. The track beam according to claim 1, wherein said hollow section contains reinforcing carbon fabric.

10. The track beam according to claim 9, wherein said hollow section and said fittings contain reinforcing carbon fabric.

11. The track beam according to claim 9, which comprises reactive materials integrated in said carbon fabric.

12. The track beam according to claim 11, wherein said reactive materials include nylon sewed or woven into said carbon fabric.

13. The track beam according to claim 1, wherein said hollow section includes two flanges defining connection devices for the inner engine cowling, formed such that an end of the inner engine cowling is insertible between said flanges.

14. The track beam according to claim 13, wherein the inner engine cowling is glued to said hollow section.

15. The track beam according to claim 13, wherein said flanges are formed with at least one bore for receiving therein a connecting element.

16. The track beam according to claim 15, wherein said connecting element is a bolt or a screw.

17. The track beam according to claim 13, which further comprises additional cover layers of fiber-reinforced synthetic material glued to the inner engine cowling and to said hollow section.

18. The track beam according to claim 1, wherein said hollow section contains stiffening structures.

19. The track beam according to claim 1, which comprises stiffening ribs integrated in said hollow section.

20. The track beam according to claim 1, wherein said hollow section is formed with grooves forming said sliding devices for displaceably mounting the thrust reverser.

21. The track beam according to claim 20, wherein said grooves are formed of carbon fabric integrated in a production process of said hollow section.

22. The track beam according to claim 20, wherein said grooves are formed with a circular arc cross-section.

* * * * *